US005411444A

United States Patent [19]

Nakamura et al.

[11] Patent Number: 5,411,444

[45] Date of Patent: May 2, 1995

[54] BELT TRANSMISSION MECHANISM

[75] Inventors: Takayuki Nakamura; Tsukasa Ono, both of Kanagawa, Japan

[73] Assignee: Fuji Photo Film Co., Ltd., Kanagawa, Japan

[21] Appl. No.: 267,234

[22] Filed: Jun. 29, 1994

[30] Foreign Application Priority Data

Jun. 29, 1993 [JP] Japan ................................. 5-158736

[51] Int. Cl.[6] ................................................ F16H 7/00
[52] U.S. Cl. ..................................... 474/148; 474/167
[58] Field of Search ......... 474/148, 167, 174, 184–187

[56] References Cited

U.S. PATENT DOCUMENTS

| | | | |
|---|---|---|---|
| 1,290,894 | 1/1919 | Bryan | 474/167 |
| 3,851,535 | 12/1974 | Presentey | 474/167 |
| 4,995,855 | 2/1991 | Hasebe et al. | 474/167 |

*Primary Examiner*—Michael Powell Buiz

*Attorney, Agent, or Firm*—Sughrue, Mion, Zinn, Macpeak & Seas

[57] ABSTRACT

A belt transmission mechanism has a crowned drive pulley, a crowned driven pulley, and a belt trained under tension around the crowned drive pulley and the crowned driven pulley. The crowned drive pulley and the crowned driven pulley are dimensioned to satisfy the equation:

$$D2/D1 = k \cdot R1/R2$$

where D1 is the diameter of the crowned drive pulley, D2 is the diameter of the crowned driven pulley, R1 is the radius of the crown of the crowned drive pulley, R2 is the radius of the crown of the crowned driven pulley, and k is a constant which is approximately 1. The belt transmission mechanism with the above drive and driven pulley dimensions can maintain its speed reduction ratio highly accurately even when the tension of the belt varies.

3 Claims, 5 Drawing Sheets

10
62
58
56
54
52a
36
34
14
18
16
60
30
28
24
52b
38b
X
38a
22c
86
84
88
S
22b
22a
26
20
12
L2
L1
80
70
76
78
82
74
72a
72b

BELT TRANSMISSION MECHANISM

BACKGROUND OF THE INVENTION

1. Field of the Invention

The present invention relates to a belt transmission mechanism having a belt trained under tension around a crowned drive pulley and a crowned driven pulley.

2. Description of the Related Art

There has heretofore been known a belt transmission mechanism which comprises a drive pulley coupled to a motor, a driven pulley having a diameter that is the same as or different from the diameter of the drive pulley, and a flat belt trained around the drive and driven pulleys. When the motor is energized, the driven pulley is rotated by the drive pulley and the belt at a predetermined transmission ratio.

The transmission ratio between the drive and driven pulleys is determined by the diameters of the drive and driven pulleys and the speed at which the belt travels. The rotational speed of the motor is transmitted to the driven pulley while being reduced or increased to a certain rotational speed by the transmission ratio.

Many drive and driven pulleys are crowned, i.e., have convex circumferential surfaces of arcuate cross section in the axial direction, for preventing the belt from being laterally dislodged from the drive and driven pulleys. If the tension of the belt varies, then the belt is elongated to different degrees on the drive and driven pulleys due to the combination of the radii of the convex surfaces of the crowned drive and driven pulleys, resulting in a change in the transmission ratio.

SUMMARY OF THE INVENTION

It is therefore an object of the present invention to provide a belt transmission mechanism which is capable of maintaining a desired transmission ratio with high accuracy even if the tension of a belt trained around crowned drive and driven pulleys varies.

To achieve the above object, there is provided in accordance with the present invention a belt transmission mechanism comprising a crowned drive pulley, a crowned driven pulley, and a belt trained under tension around the crowned drive pulley and the crowned driven pulley, the crowned drive pulley and the crowned driven pulley being dimensioned to satisfy the equation:

$$D2/D1=k\cdot R1/R2$$

where D1 is the diameter of the crowned drive pulley, D2 is the diameter of the crowned driven pulley, R1 is the radius of the crown of the crowned drive pulley, R2 is the radius of the crown of the crowned driven pulley, and k is a constant which is approximately 1.

The crowned drive pulley, the crowned driven pulley, and the belt have a speed reduction ratio which varies in a range of $\pm 0.005\%$, preferably $\pm 0.0025\%$, when the belt undergoes variations of tension.

The diameters of the drive and driven pulleys and the radii of the crowns of the drive and driven pulleys which are selected to satisfy the above relationship are effective in equalizing any elongations of the belt on the outer circumferential surfaces of the drive and driven pulleys when the tension of the belt varies. Therefore, the speed reduction ratio of the belt transmission mechanism can be kept highly accurate irrespective of variations of the belt tension. Since no special mechanism for adjusting the tension of the belt is required, the belt transmission mechanism is relatively simple in overall structure and relatively inexpensive to manufacture.

The above and other objects, features, and advantages of the present invention will become apparent from the following description when taken in conjunction with the accompanying drawings which illustrate a preferred embodiment of the present invention by way of example.

DETAILED DESCRIPTION OF THE PREFERRED EMBODIMENT

Figure 1:
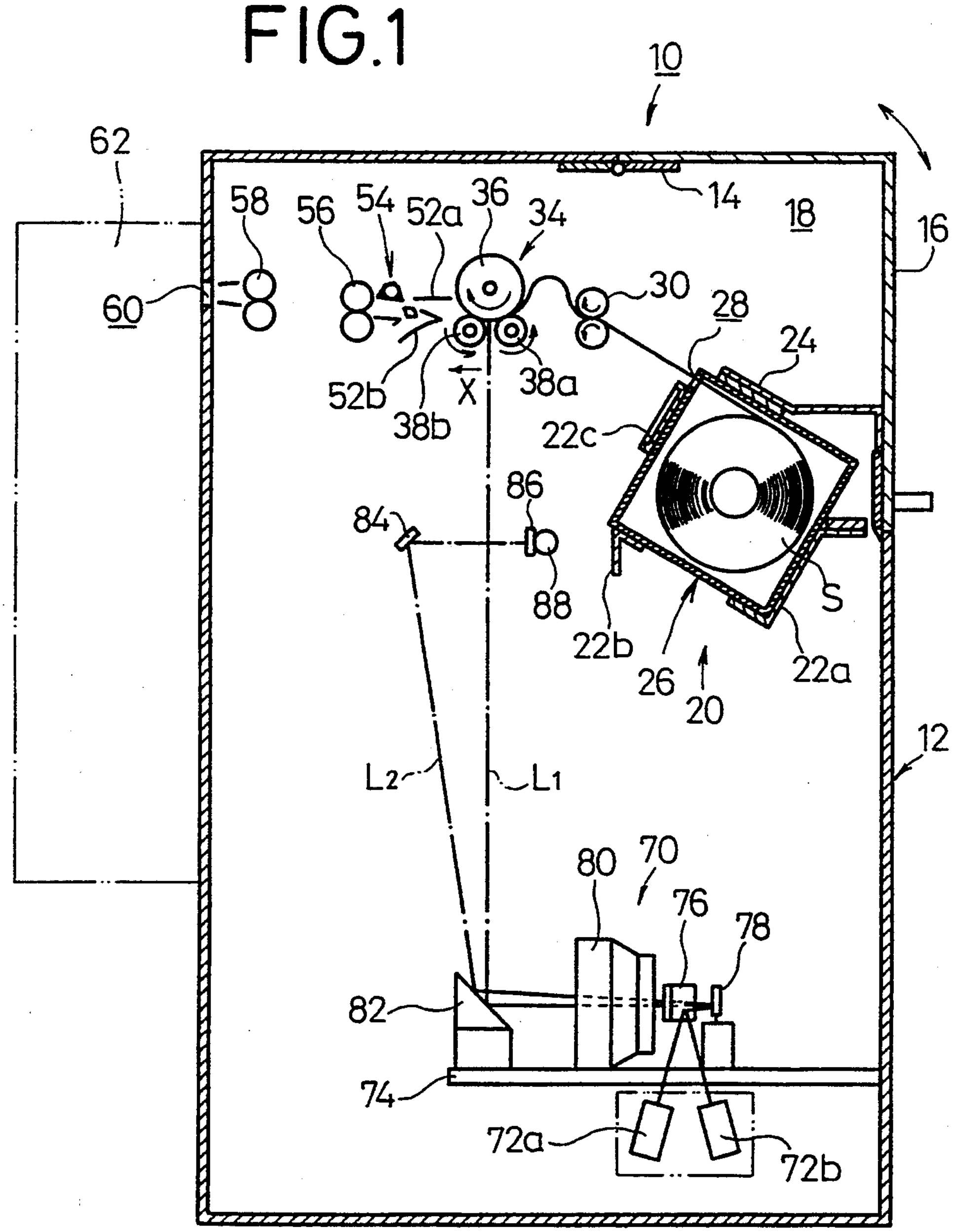
FIG. 1 is a schematic cross-sectional view of an image recording apparatus which incorporates a belt transmission mechanism according to the present invention.

In FIG. 1, an image recording apparatus, generally designated by 10, which incorporates a belt transmission mechanism according to the present invention has a housing 12 with a bent lid 16 openably and closably joined thereto by a hinge 14. The housing 12 has a chamber 18 defined therein that houses a magazine loading assembly 20. The magazine loading assembly 20 has a plurality of support bases **22*a*, 22*b*, 22*c* disposed in the chamber 18 and a presser 24 fixed to the lid 16**.

The magazine loading assembly 20 has a loaded magazine 26 which stores a roll of elongate unexposed film S. An end of the elongate unexposed film S which is drawn from a film outlet slot 28 of the magazine 26 is gripped by a pair of feed rollers 30 disposed in the chamber 18.

A feed mechanism 34 is spaced a certain distance from the feed rollers 30 in the chamber 18. The feed mechanism 34 comprises a large-diameter drive drum 36 and a pair of nip rollers **38*a*, 38*b* held in rolling contact with the drive drum 36 through a resilient member (not shown). The drive drum 36 can be rotated at a given speed by a belt transmission mechanism 40** according to the present invention.

Figure 2:
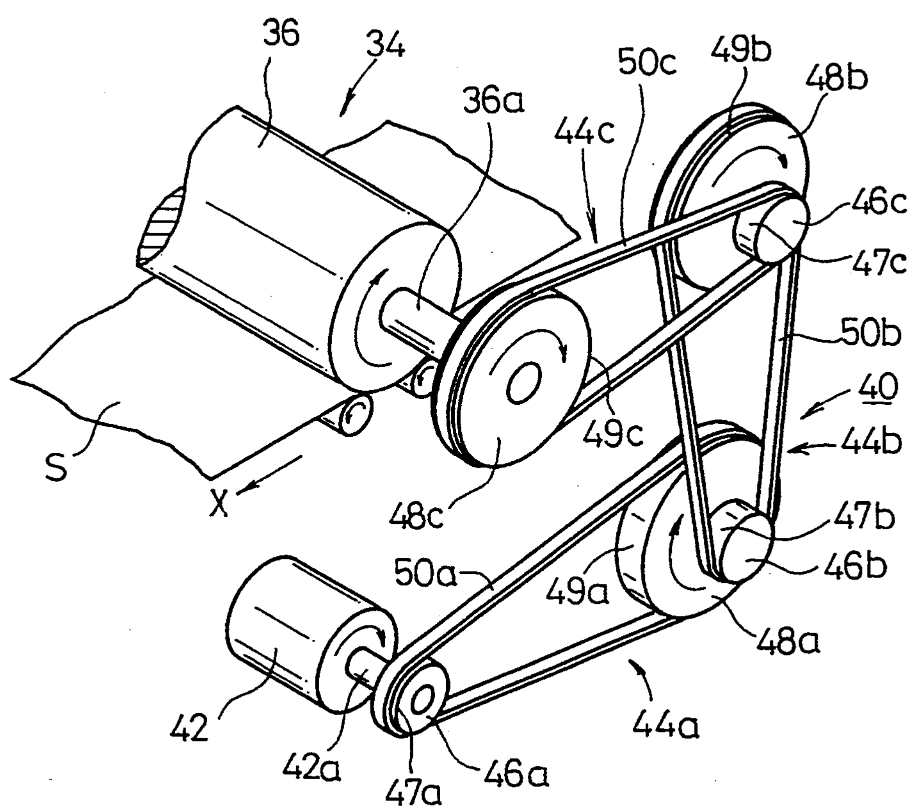
FIG. 2 is a perspective view of the belt transmission mechanism.

As shown in FIG. 2, the belt transmission mechanism 40 comprises a first speed reducer **44*a*, a second speed reducer 44*b*, and a third speed reducer 44*c* which are operatively coupled between a rotational drive source 42 and the drive drum 36. The first speed reducer 44*a* comprises a first smaller-diameter drive pulley 46*a* mounted on a rotatable drive shaft 42*a* of the rotational drive source 42, a first larger-diameter driven pulley 48*a* spaced from the first smaller-diameter drive pulley 46*a*, and a first belt 50*a* trained around the first drive pulley 46*a* and the first driven pulley 48*a***.

Figure 3:
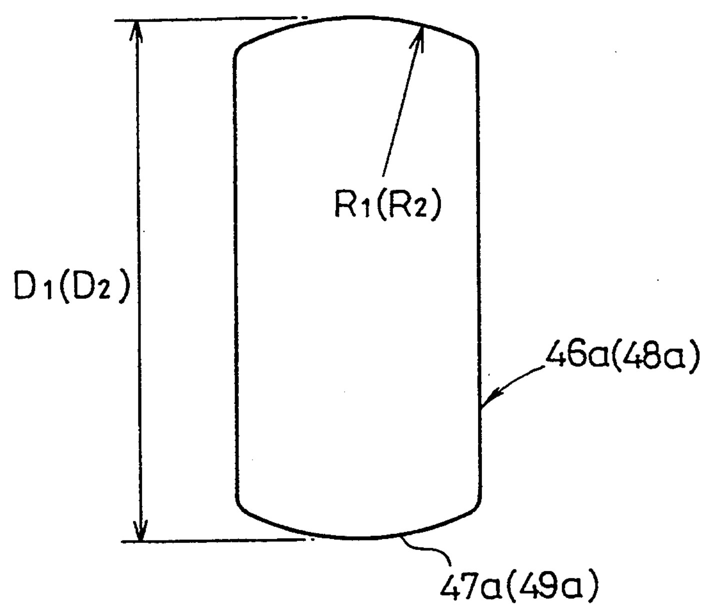
FIG. 3 is a side elevational view of each of drive and driven pulleys of the belt transmission mechanism.

The first drive pulley **46*a* and the first driven pulley 48*a* have respective crowns 47*a*, 49*a*. As shown in FIG. 3, the first drive pulley 46*a* has a diameter D1** and the crown 47a of the first drive pulley 46a has a radius R1, and the first driven pulley 48a has a diameter D2 and the crown 49a of the first driven pulley 48a has a radius R2. These diameters D1, D2 and radii R1, R2 are selected to satisfy the relationship:

$$D2/D1 = k \cdot R1/R2 (k \approx 1).$$

The second speed reducer 44b has a second smaller-diameter drive pulley 46b coaxially mounted on the first driven pulley 48a, a second larger-diameter driven pulley 48b spaced from the second smaller-diameter drive pulley 46b, and a second belt 50b trained around the second drive and driven pulleys 46b, 48b. The third speed reducer 44c has a third smaller-diameter drive pulley 46c coaxially mounted on the second driven pulley 48b, a third larger-diameter driven pulley 48c spaced from the third smaller-diameter drive pulley 46c, and a third belt 50c trained around the third drive and driven pulleys 46c, 48c.

The second and third drive pulleys 46b, 46c are identical in structure to the first drive pulley 46a in that the second and third drive pulleys 46b, 46c have respective crowns 47b, 47c. The second and third driven pulleys 48b, 48c are identical in structure to the first driven pulley 48a in that the second and third driven pulleys 48b, 48c have respective crowns 49b, 49c.

As shown in FIG. 1, a pair of guide plates 52a, 52b is positioned on a feed path along which the film S is fed by the feed mechanism 34, and a cutter 54 comprising a pair of cutter blades for cutting off the film S into a predetermined length is disposed closely to the guide plates 52a, 52b. Two pairs of rollers 56, 58 are located downstream the cutter 54 along the feed path, the pair of rollers 58 being positioned near a film discharge slot 60 defined in a wall of the housing 12 remote from the lid 16. The film discharge slot 60 opens into a developing apparatus 62.

The housing 12 accommodates therein a light beam scanner 70 disposed below the feed mechanism 34 for scanning the film S with a laser beam to record image information on the film S. The light beam scanner 70 has laser beam sources 72a, 72b for emitting a recording laser beam L1 and a synchronizing laser beam L2, respectively. The laser beam sources 72a, 72b are mounted on a reference plate 74 fixed to the housing 12. On the reference plate 74, there are disposed a mirror 76, a deflector 78 such as a galvanometer mirror, a scanning lens 80 such as an $f\theta$ lens, and a mirror 82 jointly for scanning the film S with the recording laser beam L1 emitted from the laser beam source 72a.

The synchronizing laser beam L2 emitted from the laser beam source 72b is guided toward a mirror 84 by the mirror 76, the galvanometer mirror 78, the scanning lens 80, and the mirror 82. The mirror 84 reflects the synchronizing laser beam L2 toward a reference grid plate 86 having a transmissive grid with a light guide bar 88 disposed closely behind the reference grid plate 86. Light detectors (not shown) are mounted on the respective opposite ends of the light guide bar 88 for detecting, as a pulse signal, the synchronizing laser beam L2 that has passed through the reference grid plate 86 and the light guide bar 88.

Operation of the image recording apparatus 10 will be described below in relation to the belt transmission mechanism 40 according to the present invention.

The lid 14 is opened about the hinge 14 with respect to the housing 12, and the magazine 26 is loaded into the magazine loading assembly 20. The magazine 26 stores a roll of elongate unexposed film S therein, and an end of the film S is drawn through the film outlet slot 28 and gripped by the feed rollers 30.

Then, the lid 16 is closed, and the feed rollers 30 are rotated. The feed mechanism 34 and the feed rollers 30 are rotated in synchronism with each other while allowing the film S to sag to a certain extent between the feed mechanism 34 and the feed rollers 30. When the rotational drive source 42 of the belt transmission mechanism 40 is energized to rotate the drive shaft 42a in the direction indicated by the arrow, the first drive pulley 46a coupled to the drive shaft 42a is rotated in the same direction, and the first driven pulley 48a operatively connected to the first drive pulley 46a by the first belt 50a is rotated in the direction indicated by the arrow at a relatively low speed.

The rotation from the first drive pulley 46a is transmitted to the drive drum 36 while being reduced in speed by the second drive pulley 46b , the second belt 50b, and the second driven pulley 48b of the second speed reducer 44b, and also by the third drive pulley 46c, the third belt 50c, and the third driven pulley 48c of the third speed reducer 44c. Therefore, the drive drum 36 is rotated at a considerably low speed in the direction indicated by the arrow for thereby feeding the film S gripped by the drive drum 36 and the nip rollers 38a, 38b in the auxiliary scanning direction indicated by the arrow X.

At the same time, the light beam scanner 70 is energized. Specifically, the laser beam sources 72a, 72b are energized to emit respective laser beams L1, L2, which are reflected by the mirror 76 to the galvanometer mirror 78. The galvanometer mirror 78 as it swings back and forth deflects the laser beams L1, L2. The laser beam L1 travels through the scanning lens 80 and is reflected by the mirror 82 so as to be applied to and hence scan the film S between the nip rollers 38a, 38b. The laser beam L2 which is also reflected by the mirror 82 is reflected by the mirror 84, and passes the reference grid plate 86 into the light guide bar 88. Then, the laser beam L2 is detected as a pulse signal by the light detectors on the respective opposite ends of the light guide bar 88. The pulse signal generated by the light detectors is frequency-multiplied into a synchronizing signal.

The laser beam L1 scans the film S in the main scanning direction normal to the auxiliary scanning direction while at the same time the film S is being fed in the auxiliary scanning direction by the feed mechanism 34. Since the laser beam L1 is modulated by desired image information, the laser beam L1 records a two-dimensional image corresponding to the image information on the film S.

The exposed film S is then guided by the guide plates 52a, 52b to travel along the feed path in the direction indicated by the arrow X, and delivered toward the film discharge slot 60 by the roller pairs 56, 58. On the way toward the film discharge slot 60, the film S is cut to a desired length by the cutter 54. The cut film length is then discharged from the film discharge slot 60 and supplied into the developing apparatus 62. In the developing apparatus 62, the image on the film length is developed into an original film plate, which may be used in any of various applications.

As described above with reference to FIG. 3, the diameter D1 of the first drive pulley 46a, the radius R1 of the crown 47a of the first drive pulley 46a, the diameter D2 of the first driven pulley 48a, and the radius R2 of the crown 49a of the first driven pulley 48a are selected to meet the equation:

$$D2/D1=k \cdot R1/R2 (k \approx 1).$$

This relationship of these diameters and radii is effective in causing the first belt 50a to elongate to substantially the same extent on the outer circumferential surfaces of the first drive and driven pulleys 46a, 48a, thereby reliably preventing the speed reduction ratio of the first speed reducer 44a from varying, even when the tension of the first belt 50a varies. In addition, since any tension adjusting mechanism for keeping the first belt 50a under constant tension is not required, the belt transmission mechanism 40 is relatively simple in overall structure and can be manufactured relatively inexpensively.

Figure 4:
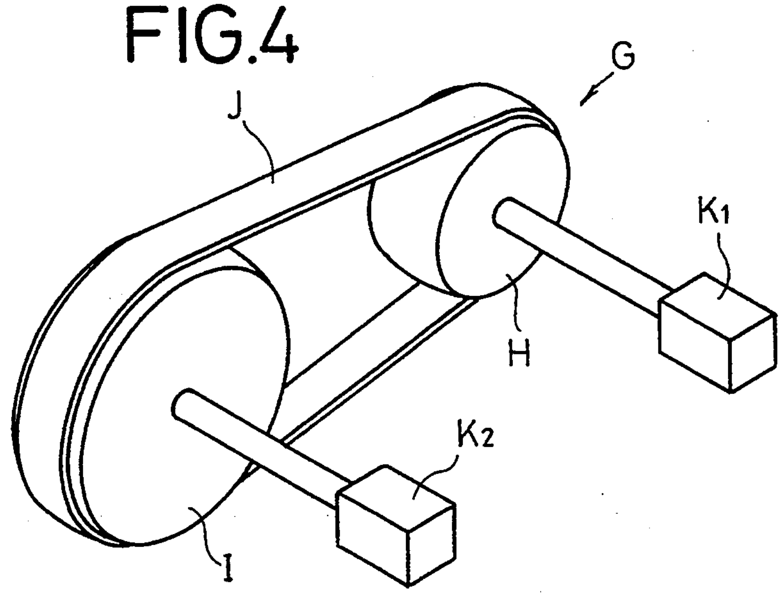
FIG. 4 is a schematic perspective view of a belt transmission mechanism used in an experiment for determining the relationship between belt tensions and speed reduction ratios.

The inventor experimentally determined the relationship between belt tensions and speed reduction ratios using differently dimensioned samples of a belt transmission mechanism G of different dimensions as shown in FIG. 4. The belt transmission mechanism G comprises a drive pulley H, a driven pulley I, and a belt J trained around the drive and driven pulleys H, I. Encoders K1, K2 are coupled respectively to the drive and driven pulleys H, I.

The belt transmission mechanism samples, indicated A through F in Table 1 below, had different drive and driven pulley diameters and crown radii as shown in Table 1. The results of the experiment are shown in FIGS. 5 and 6.

TABLE 1

| | Driven pulley I | | Drive pulley H | | Speed |
|---|---|---|---|---|---|
| | Diameter (mm) | Crown R (mm) | Diameter (mm) | Crown R (mm) | reduction ratio |
| A | 100 | 150 | 20 | 200 | Not const. |
| B | 100 | 150 | 20 | 500 | Not const. |
| C | 100 | 150 | 20 | 750 | const. (0.2000) |
| D | 100 | 100 | 20 | 500 | const. (0.2000) |
| E | 100 | 50 | 20 | 250 | const. (0.2000) |
| F | 120 | 100 | 40 | 300 | const. (0.3333) |

Figure 5:
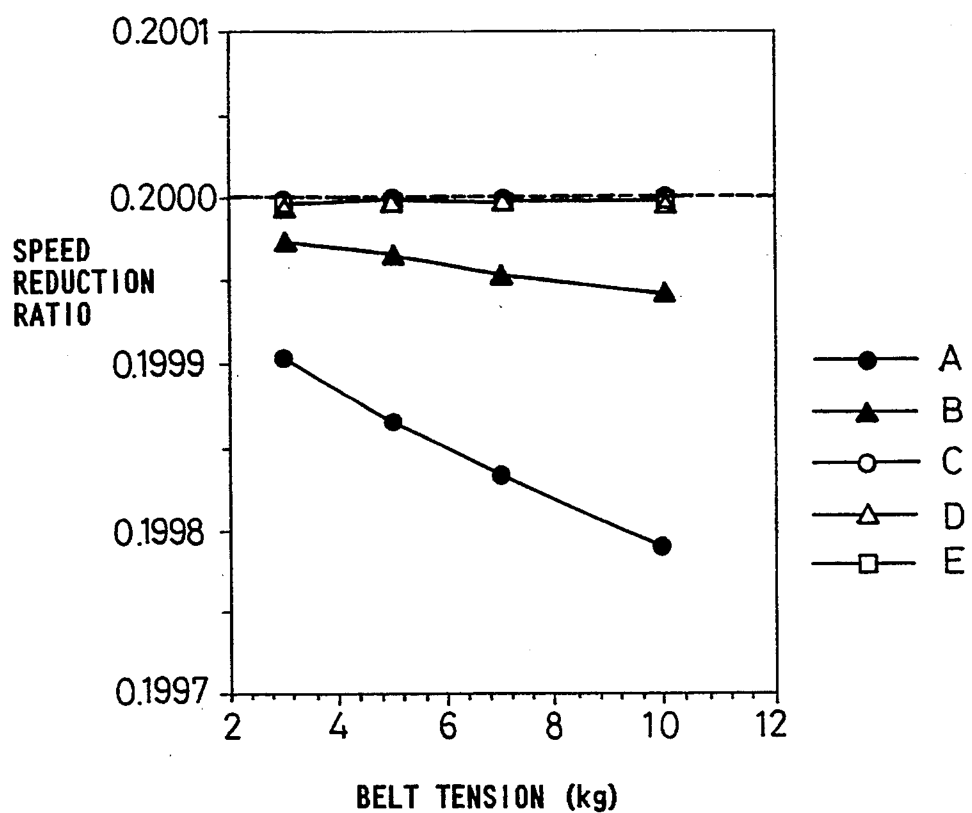
FIGS. 5 and 6 are diagrams showing how the speed reduction ratios of differently dimensioned belt transmission mechanism samples vary under different belt tensions.
Figure 6:
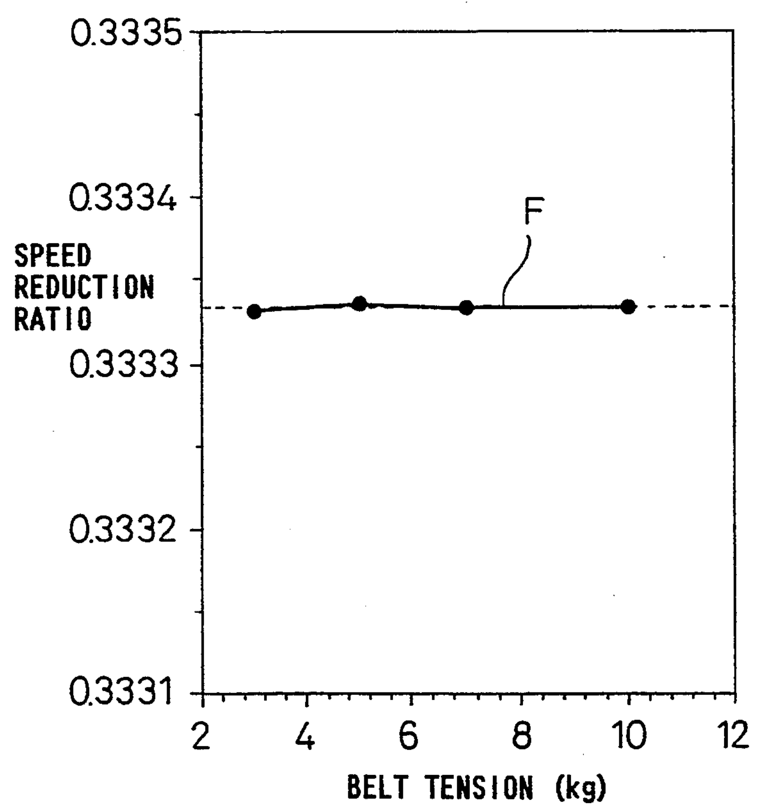

As can be understood from FIGS. 5 and 6, the speed reduction ratio has a variation or error kept within a range of ±0.0025% irrespective of belt tension variations for those belt transmission mechanism samples C through F which satisfy the equation $D2/D1=R1/R2$. Therefore, these belt transmission mechanism samples C through F are capable of transmitting the rotational power highly accurately. Any speed reduction ratio error should be limited to ±0.005% or less, preferably ±0.0025%, for the purpose of feeding the film S highly accurately in the auxiliary scanning direction. To meet this requirement, the constant k in the equation $D2/D1=k \cdot R1/R2$ is set to $k \approx 1$.

Although a certain preferred embodiment of the present invention has been shown and described in detail, it should be understood that various changes and modifications may be made therein without departing from the scope of the appended claims.

What is claimed is:

1. A belt transmission mechanism comprising:
a crowned drive pulley;
a crowned driven pulley; and
a belt trained under tension around said crowned drive pulley and said crowned driven pulley;
said crowned drive pulley and said crowned driven pulley being dimensioned to satisfy the equation:

$$D2/D1=k \cdot R1/R2$$

where D1 is the diameter of said crowned drive pulley, D2 is the diameter of said crowned driven pulley, R1 is the radius of the crown of said crowned drive pulley, R2 is the radius of the crown of said crowned driven pulley, and k is a constant which is approximately 1.

2. A belt transmission mechanism according to claim 1, wherein said crowned drive pulley, said crowned driven pulley, and said belt have a speed reduction ratio which varies in a range of ±0.005% when said belt undergoes variations of tension.

3. A belt transmission mechanism according to claim 2, wherein said crowned drive pulley, said crowned driven pulley, and said belt have a speed reduction ratio which varies in a range of ±0.0025% when said belt undergoes variations of tension.

* * * * *